Nov. 23, 1926.
H. A. CAMPBELL
1,608,369
FLOW BOX FOR OIL LINES
Filed May 27, 1926
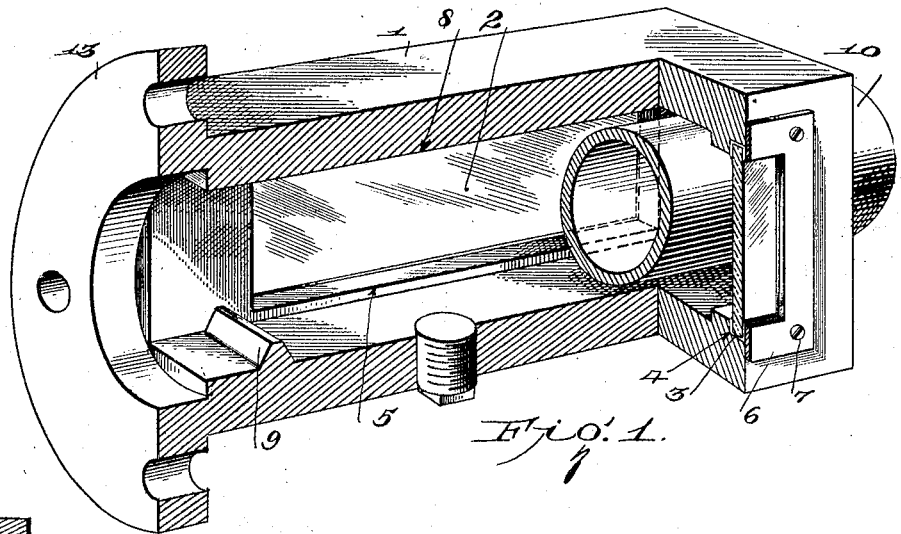
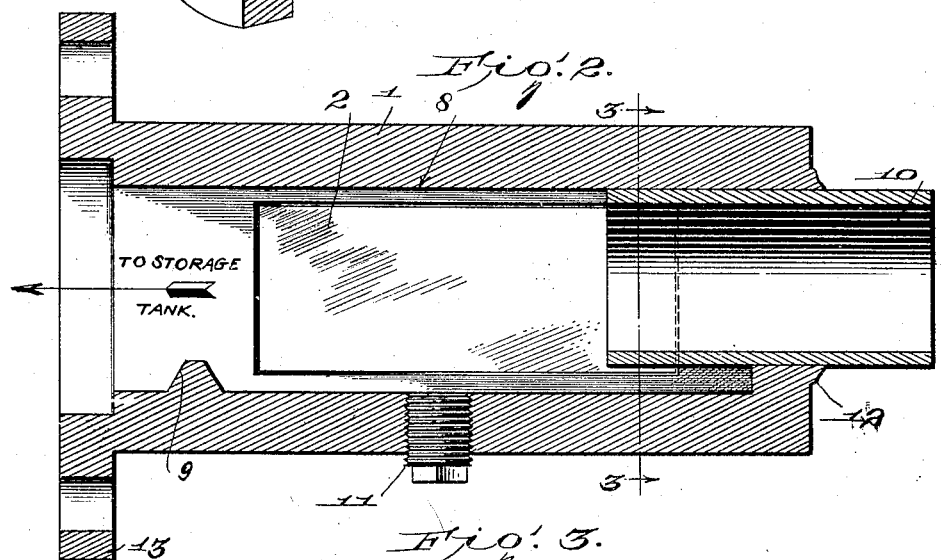
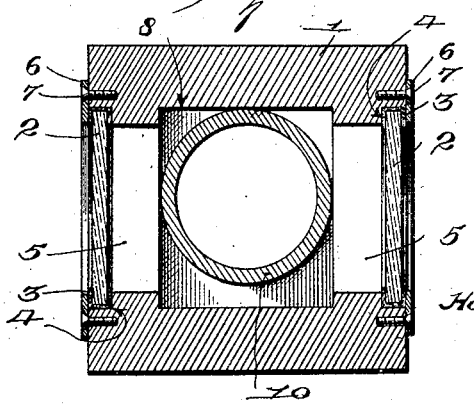
WITNESSES
INVENTOR
Harry A. Campbell
BY
ATTORNEYS Patented Nov. 23, 1926.

1,608,369

UNITED STATES PATENT OFFICE.

HARRY A. CAMPBELL, OF WICHITA FALLS, TEXAS, ASSIGNOR OF FIFTEEN-SIXTEENTHS TO THOMAS LOMAX, JR., OF WICHITA FALLS, TEXAS.

FLOW BOX FOR OIL LINES.

Application filed May 27, 1926. Serial No. 112,186.

This invention relates to improvements in flow boxes, and an object of the invention is to provide a windowed box connected in an oil line between the well and the storage tank so that the operator is able at any time to observe the rate of flow and the character of the fluid produced by the well.

Other objects and advantages appear in the following specification, reference being had to the accompanying drawing in which Figure 1 is a sectional perspective view of the improved flow box.

Figure 2 is a central longitudinal section.

Figure 3 is a detail cross section taken substantially on the line 3—3 of Figure 2.

The importance and need of the flow box becomes more apparent when the specific use thereof is understood. A number of the Western States, for instance Texas, Oklahoma and Kansas produce a light gravity oil which is rich in gas and volatile matter. The loss of the gas and volatile matter lowers the gravity of the oil, and as the price is fixed by the gravity, it is readily seen that measures are taken to prevent the losses.

The quest for means to conserve the gas and volatile matter has led to the development and production of vapor-type gathering systems, wherein a slight pressure is maintained at all times upon the fluid, valves being installed, in practice, to release any excessive pressure building up in the storage tank. The gas thus released does not go to waste but is used on the property, but this is a matter incident to the operator's problem and has nothing to do with the invention. The foregoing pressure maintained upon the oil in the storage tank is sufficient to prevent a great percentage of loss by evaporation and consequently the lowering of the gravity of the oil is small.

It is the practice to pump the oil from the well from a pipe line into a tank. It is the obvious aim of the producer to pump as much oil out of the well as possible, but care in operating the pump must be observed. Pumping at too high speed tends to agitate the oil with the result that the included gas is liberated in the well, producing what is known as "heads" which may be of a two or more minutes' duration. The gas thus liberated does not return to the liquid, and the result of the formation of the "head" is a lowering in gravity of the oil.

In order to secure an ideal pumping condition, it is necessary that the flow of oil be observed, and unless some means of observation is provided in the pipe line, it becomes a matter of guesswork to regulate the pumping rate. It is remembered that the particular kind of oil now under consideration is contained in a vapor-tight system and there is no possible way to observe the oil flow from the well without opening the man-hole on the tank, or the gas trap, and when this is done, the gas pressure is reduced with the undesirable results already indicated.

The need that has developed under the foregoing conditions has resulted in the adaptation of a window to a specific new use, mainly the incorporation of a so-called flow box in the pipe line, from the producing well to the storage tank. The flow box 1 has plate-glass windows 2 which are strong enough to withstand the internal pressure. The edges of the panes or windows are cemented at 3 in rabbets 4 of the lateral window openings 5. The windows are held in place by steel frames 6 which are secured upon the outside of the box at 7.

According to the illustration the flow box 1 is of a generally rectangular shape, although it is conceivable that the box may be made of other shapes without sacrificing any advantages. The interior chamber 8 is rectangular in cross section (Fig. 3). The window openings 5 extend from the chamber 8 at diametrically opposite points. The windows 2 are situated in parallel planes thereby enabling the operator to look at the oil from either side.

A baffle 9 extends across the chamber 8 near the discharge end, the baffle being located at a point in advance of the nearest edges of the window openings 5. The top of the baffle is substantially in line with the lowermost part of the inlet pipe 10. This pipe extends into the chamber 8 off-center, that is to say the pipe is closer to the ceiling of the chamber than it is to the floor (Figure 2). This arrangement of the pipe and the baffle produce what might be known as a receptacle in which refuse will collect. Such refuse may consist of sand, etc. and inasmuch as the top of the baffle extends slightly above the bottom of the window openings the operator is enabled to see when the receptacle has become filled with refuse whereupon he can remove the drain plug 11 to clear the box. Or in lieu of the plug 11 a bleeder pipe may be screwed in so that samples of fluid may be abstracted from time to time.

The inlet pipe is permanently or threadedly attached to the box 1, at 12. The opposite end of the box is flanged at 13 so that a coupling flange of the continuation of the oil line may be bolted in place.

I claim:—

1. A device of the character described comprising a box having an internal chamber with diametrically opposite window openings, windows secured over said openings permitting observation of the interior of the box, a baffle extending across the chamber in advance of one end of the window openings, an inlet pipe extending into the chamber from the opposite end of the box and being disposed closer to the ceiling of the chamber than to the floor, and means permitting extraction of the substance collected in the receptacle defined by said baffle and the disposition of said inlet pipe.

2. A device of the character described comprising a box having an internal chamber with diametrically opposite window openings which are narrower than the chamber is high, transparent windows secured over the openings permitting observation of the interior, a baffle extending across the floor of the chamber adjacent to one end of the windows, and extending above the bottom of the windows, an inlet pipe introduced into the chamber from the opposite end of the box, said pipe being disposed off center in respect to the chamber so that it comes closer to the ceiling than to the floor of the chamber, the bottom of the pipe being substantially level with the top of the baffle thereby permitting the collection of sediment to a level above the bottom of the windows, and means permitting extraction of the sediment from the receptacle defined by said baffle and the particular disposition of the inlet pipe.

3. A device of the character described comprising a box having an internal chamber and diametrically opposite window openings having peripheral rabbets communicating with adjacent outer walls of the box, transparent windows seated and cemented in said rabbets, frames affixed to the box and covering the edges of said windows to hold them in place, an inlet pipe introduced into the chamber at one end being situated off center to be nearer the ceiling of the chamber than to the floor, a baffle extending across the floor of the chamber adjacent to the opposite end of the box, the top of the baffle and the bottom of the inlet pipe defining a receptacle, means at the end of the box adjacent to the baffle permitting coupling of the continuation of the pipe line to the box, and means for abstracting substance collected in said receptacle during the flow of oil through the box.

HARRY A. CAMPBELL.

Certificate of Correction.

It is hereby certified that the name of the assignee in Letters Patent No. 1,608,369, granted November 23, 1926, upon the application of Harry A. Campbell, of Wichita Falls, Texas, for an improvement in "Flow Boxes for Oil Lines," was erroneously written and printed as "Thomas Lomax, jr.," whereas said name should have been written and printed as *Thornton Lomax, jr.*, as shown by the records of assignments in this office; and that the said Letters Patent should be read with this correction therein that the same may conform to the record of the case in the Patent Office.

Signed and sealed this 28th day of December, A. D. 1926.

[SEAL.]

M. J. MOORE,
*Acting Commissioner of Patents.*